United States Patent [19]

Kremer

[11] 4,035,384
[45] July 12, 1977

[54] BASIC DYESTUFFS

[75] Inventor: Gilbert Victor Henri Kremer, Eaubonne, France

[73] Assignee: Produits Chimiques Ugine Kuhlmann, Paris, France

[21] Appl. No.: 616,214

[22] Filed: Sept. 24, 1975

[30] Foreign Application Priority Data

Oct. 7, 1974 France .............................. 74.33623

[51] Int. Cl.² ...................................... C07D 209/90
[52] U.S. Cl. ......................... 260/326.9; 8/177 AB; 260/42.21; 260/42.43; 260/42.48; 260/326.5 B
[58] Field of Search ................................ 260/326.9

[56] References Cited

U.S. PATENT DOCUMENTS

| 3,347,865 | 10/1967 | Brack et al. | 260/326.9 |
| 3,959,310 | 5/1976 | Brack et al. | 260/326.9 |
| 3,963,741 | 6/1976 | Schefczin et al. | 260/326.9 |
| 3,992,405 | 11/1976 | Brack | 260/326.9 |

FOREIGN PATENT DOCUMENTS

| 301,342 | 1/1969 | U.S.S.R. | 260/326.9 |

Primary Examiner—Donald G. Daus
Assistant Examiner—Mary C. Vaughn

Attorney, Agent, or Firm—Beveridge, DeGrandi, Kline

[57] ABSTRACT

The invention relates to new basic dyestuffs of the formula:

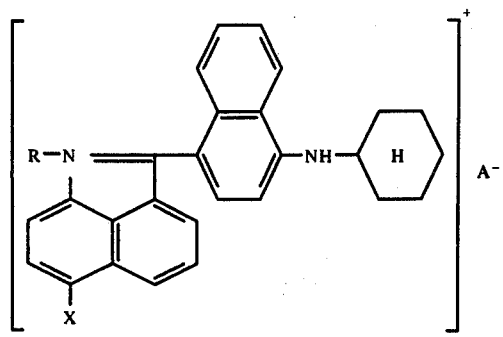

in which R represents a methyl or ethyl group, X represents a hydrogen or bromine atom and A represents a monovalent anion which has no coloring function in the dyestuff. These dyestuffs impart a neutral blue shade, fast to artificial light, to acrylonitrile or vinylidene cyanide polymers dyed therewith, and products made therefrom including fibers, yarns, fabrics and the like.

2 Claims, No Drawings

BASIC DYESTUFFS

The present invention relates to new basic dyestuffs and particularly to basic dyestuffs useful for coloring or dyeing acrylonitrile or vinylidene cyanide polymers, and products made therefrom such as fibers, yarns, fabrics and the like.

As has been indicated in French Pat. No. 1,513,876 of Mar. 9, 1967, there is a need in numerous fields of use, for dyestuffs which impart to polyacrylic fibers a neutral blue color which is stable to artificial light.

It has now been found that such a color or shade is obtained with the dyestuffs of the formula:

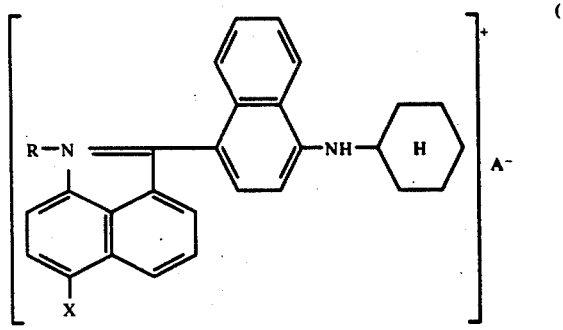

(I)

in which R represents a methyl or ethyl group, X represents a hydrogen or bromine atom and A represents a monovalent anion.

The new dyestuffs of formule (I) may be prepared, for example, 1. by the action of an alkylating agent, such as methyl or ethyl sulphate, on 2-[4-cyclohexylamino-naphthyl (1)]- benz (c, d)-indole or its 6-bromo-derivative, resulting from the condensation of perinaphtholactam or 6-bromo-naphtholactam and cyclohexyl α-naphthylamine, or 2. by condensation of a N-alkyl-perinaphtholactam of formula:

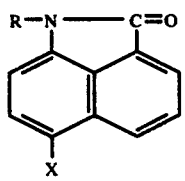

(II)

in which R and X have the same significance as above, with N-cyclohexyl α-naphthylamine in the presence of a dehydrating agent, such as phosphorus oxychloride, phosphorus oxybromide phosphorus trichloride, and the like. Zinc chloride may also be present with such dehydrating agent in the condensation reaction.

The anion $A^-$ may be, for example, a chloride, sulphate, nitrate, acetate or methosulphate anion, or a complex anion such as the tetrachlorozincate anion. This anion has no coloring or dyeing function and may be exchanged, if desired, with another anion which, likewise, imparts no coloring function to the dyestuff.

Compared with the dyestuffs described in the above-mentioned French patent, the dyestuffs according to the invention have the advantage of a better fastness to light.

In the following Examples, the parts indicated are parts by weight.

EXAMPLE 1

9.15 parts of N-methyl-perinaphtholactam, 5 parts of dry zinc chloride powder and 42 parts of phosphorus oxychloride are mixed with stirring, at ambient temperature. 11.25 parts of N-cyclohexyl α-naphthylamine dissolved in 35 parts of chloroform are then introduced over a period of 15 minutes into the mixture as it is being stirred, and the resulting mixture is then boiled for 7 hours and stirring is continued during this time.

50 parts of water are then added thereto over a period of one hour and the chloroform is driven off by steam distillation. During cooling to ambient temperature, the dyestuff is precipitated in the remaining aqueous solution. The dyestuff is isolated by filtration, washed on the filter with 100 parts of 2.5% brine and then dried in an oven at 40° C. 28 parts of a dyestuff are thus obtained which dyes polyacrylonitrile fibers a bright blue shade, and such fibers have a good general fastness and are not altered in shade when subjected to artificial light over extended periods of time.

EXAMPLE 2

The process of Example 1 is repeated except that the N-methyl-perinaphtholactam is replaced by N-ethyl-perinaphtholactam.

The dyestuff which is obtained also dyes polyacrylonitrile or vinylidene cyanide polymers, such as fibers, yarns, textiles and the like a similar shade of blue and the polymer is resistant to fading when subjected to artificial light.

EXAMPLE 3

The process of Example 1 is repeated except that the N-methyl-perinaphtholactam is replaced by N-methyl-6-bromo-perinaphtholactam. The dyestuff which is obtained dyes polyacrylonitrile fibers a similar shade of blue.

Similar results are obtained when N-methyl-perinaphtholactam is replaced by N-ethyl-6-bromo-perinaphtholactam.

EXAMPLE 4

A dyebath is prepared at 40–50° C with 2000 parts of water, 10 parts of a 1% solution of wetting agent known as Unisol T, 10 parts of N acetic acid, and 0.125 parts of the dyestuff of Example 1. Then, 25 parts of polyacrylonitrile fibers are inserted into this dyebath and the temperature is brought to 70° C at the rate of 1° C/mn and then to the boiling point at the rate of 1° C/3–4 mn. The dyebath is kept at the boiling point for 1 hour. After cooling to 60° C, the fibers are rinsed and dried. They are dyed a bright blue shade. The acrylonitrile or vinylidene cyanide polymers, whether they be in bulk form or in the form of fibers, yarns, fabrics, textiles or the like may be colored or dyed with the dyestuffs of the present invention by the usual processes which are known to those having ordinary skill in this art.

I claim:

1. A dyestuff of the formula:

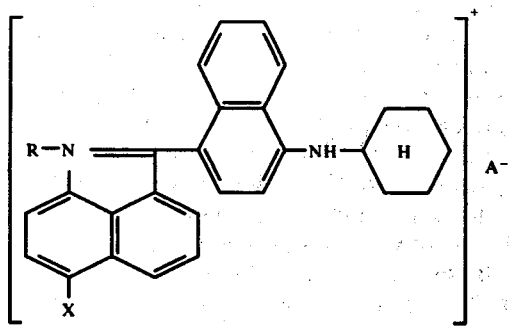

in which R represents a member selected from the group consisting of methyl and ethyl, X is hydrogen or bromine and A represents a monovalent anion which does not impart any coloring function to said dyestuff.

2. The dyestuff as defined in claim 1 wherein A is a monovalent anion selected from the group consisting of chloride, sulphate, nitrate, acetate, methosulphate and tetrachlorozincate anions.

* * * * *